(12) United States Patent
Peric et al.

(10) Patent No.: US 11,506,267 B2
(45) Date of Patent: Nov. 22, 2022

(54) BALL SCREW DRIVE

(71) Applicant: SFS intec Holding AG, Heerbrugg (CH)

(72) Inventors: Edi Peric, Heiden (CH); Andre Schadlich, Haag (CH); Stefan Frei, Widnau (CH); Marijo Zach, Widnau (CH)

(73) Assignee: SFS intec Holding AG, Heerbrugg (CH)

( * ) Notice: Subject to any disclaimer, the term of this patent is extended or adjusted under 35 U.S.C. 154(b) by 6 days.

(21) Appl. No.: 16/522,036

(22) Filed: Jul. 25, 2019

(65) Prior Publication Data

US 2020/0049238 A1 Feb. 13, 2020

(30) Foreign Application Priority Data

Aug. 9, 2018 (EP) .................................... 18188140

(51) Int. Cl.
*F16H 25/20* (2006.01)
*F16H 25/22* (2006.01)

(52) U.S. Cl.
CPC ..... *F16H 25/2015* (2013.01); *F16H 25/2204* (2013.01)

(58) Field of Classification Search
CPC ............. F16H 25/2015; F16H 25/2204; Y10T 74/18688
See application file for complete search history.

(56) References Cited

U.S. PATENT DOCUMENTS

| 808,273 | A | * | 12/1905 | Darlington | .......... F16H 25/2015 192/141 |
| 2,446,393 | A | * | 8/1948 | Russell | ............... F16H 25/2015 318/675 |
| 2,590,251 | A | * | 3/1952 | Hoover | .................. G05G 15/04 74/89.37 |
| 2,715,341 | A | * | 8/1955 | Hogan | ................ F16H 25/2015 74/89.37 |
| 3,029,660 | A | * | 4/1962 | Sears | .................. F16H 25/2015 74/89.37 |
| 3,319,481 | A | * | 5/1967 | Goodman | ........... F16H 25/2015 74/89.37 |

(Continued)

FOREIGN PATENT DOCUMENTS

| DE | 10219840 | 11/2003 | |
| DE | 102008014995 A1 | * 9/2009 | ............. F16D 65/56 |

(Continued)

*Primary Examiner* — Bobby Rushing, Jr.
(74) *Attorney, Agent, or Firm* — Volpe Koenig

(57) ABSTRACT

A ball screw drive (10) including a threaded spindle (12) and a spindle nut (14) which at least partially coaxially encloses the threaded spindle (12) and has a stop at an axial end face (18). A multiplicity of balls can circulate in the space (16) between the threaded spindle (12) and the spindle nut (14). A radial stop element (22) is connected to the threaded spindle (12) in a force-fitting manner and adapted to interact with the complementary axial end face (18) of the spindle nut (14). A bearing element is provided for receiving a first longitudinal end of the spindle nut (12). The radial stop element (22) and the bearing element are designed in combination as an integral bearing/stop element (24) which has two anti-rotation features (26, 28).

6 Claims, 1 Drawing Sheet

(56) References Cited

U.S. PATENT DOCUMENTS

| | | | | |
|---|---|---|---|---|
| 4,712,440 | A * | 12/1987 | Rousselot | E05F 15/603 |
| | | | | 74/89.39 |
| 5,461,935 | A * | 10/1995 | Hill | F16H 25/2015 |
| | | | | 192/141 |
| 6,409,658 | B1 * | 6/2002 | Mitsumori | A61B 1/00096 |
| | | | | 600/130 |
| 8,656,798 | B2 * | 2/2014 | Kawahara | F16H 25/20 |
| | | | | 74/89.32 |
| 8,800,341 | B2 * | 8/2014 | Osterlanger | F16D 65/567 |
| | | | | 72/370.17 |
| 9,182,022 | B2 * | 11/2015 | Wingett | F16H 25/2015 |
| 9,340,190 | B2 * | 5/2016 | Qian | B60T 1/065 |
| 9,587,725 | B2 * | 3/2017 | Wingett | F16H 25/2204 |
| 10,550,903 | B2 * | 2/2020 | Sala | F16D 65/18 |
| 2007/0029142 | A1 * | 2/2007 | Drennen | F16D 65/18 |
| | | | | 188/72.7 |
| 2012/0085139 | A1 | 4/2012 | Osterlanger et al. | |
| 2012/0142213 | A1 * | 6/2012 | Sheehan | H01R 13/64 |
| | | | | 439/551 |
| 2017/0198790 | A1 * | 7/2017 | Ungar | F16H 25/2015 |
| 2018/0058553 | A1 * | 3/2018 | Kick-Rodenbuecher | |
| | | | | F16H 25/2015 |

FOREIGN PATENT DOCUMENTS

| | | | |
|---|---|---|---|
| DE | 202008062180 | 9/2009 | |
| DE | 102009036824 | 2/2011 | |
| DE | 102016113395 | 1/2018 | |
| WO | WO-2018192611 A1 * | 10/2018 | F16H 25/2204 |

* cited by examiner

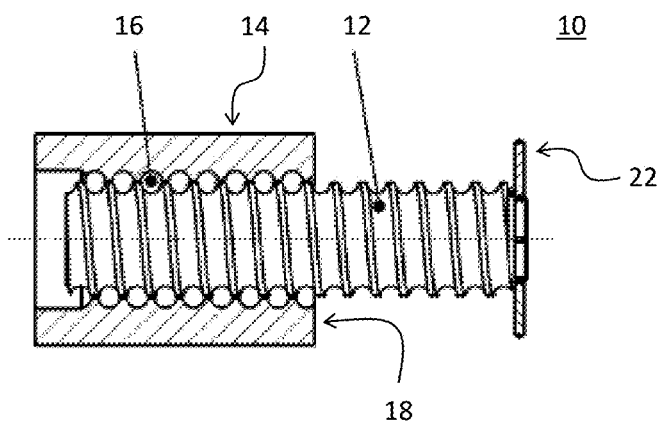
Figure 1
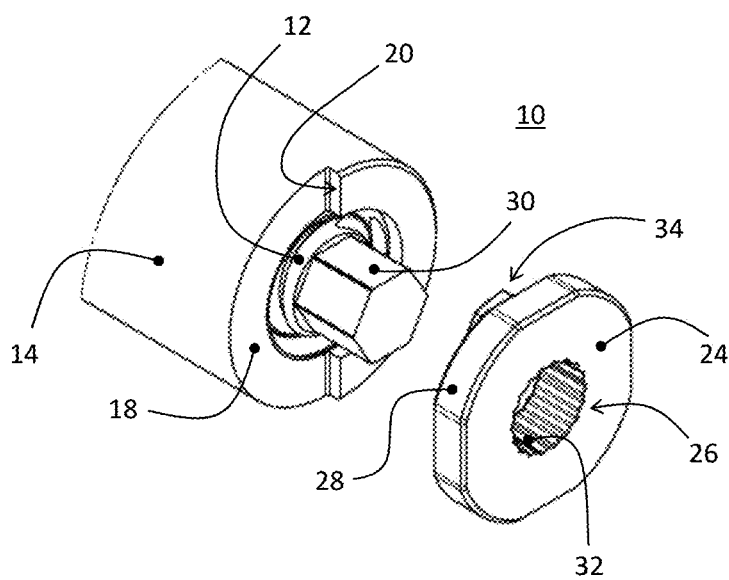
Figure 2
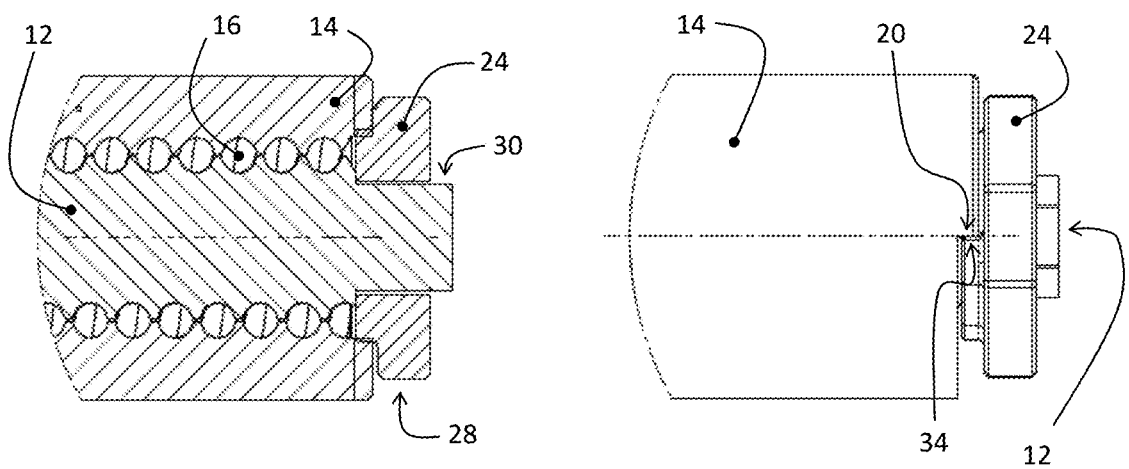
Figure 3A
Figure 3B

BALL SCREW DRIVE

INCORPORATION BY REFERENCE

The following documents are incorporated herein by reference as if fully set forth: European Patent Application No. 18188140.0, filed Aug. 9, 2018.

TECHNICAL FIELD

The present invention refers to a ball screw drive, in particular a simplified construction of the anti-jamming protection at the end stop of a ball screw drive.

TECHNICAL BACKGROUND

A ball screw or ball screw drive (BSD) is usually referred to as a roller screw drive with balls as rolling elements. The main components of a BSD include a threaded spindle and a spindle nut surrounding this spindle. During operation, balls circulate between these two components, wherein the thread grooves of both the threaded spindle and the spindle nut are complementary and matched to one another in such a manner that they act as ball guides. Unlike a screw-nut connection, in which the thread flanks slide flatly against each other, in case of the BSD, the rotating balls in the thread designed as a ball channel take over the load transfer between nut and spindle. The flat sliding movement is thus replaced by a rolling movement, which is accompanied by reduced friction.

In order to obtain a closed circulation path for the balls, one or more ball deflectors are used in a spindle nut. The deflector has the task of lifting the balls out of the ball guide at a first point between the spindle nut and the threaded spindle and returning them at a second point. The ball return is therefore a bypass that bridges one or more thread grooves of the nut-spindle system.

From a technical point of view, a BSD functions as a worm gear capable of converting a rotary motion into a longitudinal motion, whereby the reduction or transmission ratio is determined by the dimensioning of the threaded spindle, or more precisely by the pitch of the thread.

Ball screws are used in many technical applications, especially in mechanical engineering and preferably in machine tools. BSDs are also increasingly being used as longitudinal drives in fields where hydraulic or pneumatic systems were previously used, e.g. in presses, injection molding machines and power steering systems. BSDs are also playing an increasingly important role in electromechanical and electro-hydraulic braking systems, where BSDs are used as a replacement for hydraulic brake cylinders or parallel to well-known braking systems in brake assist systems.

It is apparent that during operation the travel of the spindle nut is limited to the length of the spindle nut, because when the spindle and nut are separated, the balls would lose their guidance. The simplest solution to this problem is to provide a flange at the longitudinal end of the spindle which acts as a limit stop for the spindle nut.

PRIOR ART

A flange as an axial end stop attached to the spindle acts as a frontal limit for the travel of the spindle nut. However, the design has a decisive disadvantage, because in a nut-spindle arrangement, due to the relative rotary movement of the spindle and nut, an angular momentum must be absorbed in addition to the momentum in the direction of the longitudinal axis of the spindle. In case of the BSD, the well-known self-locking effect desired with a screw-nut combination can result in jamming of spindle nut and threaded spindle, which then requires a very high release torque.

Therefore, DE 10 2016 113 395 proposes to connect a radial stop plate to the spindle in a rotationally fixed manner and to provide a projection on the spindle nut in axial direction on the outer circumference of the end face. When the nut approaches the end of the spindle, the projection of the nut abuts against the radial stop plate in the end position and stops the rotation.

SUMMARY

It is an object of the present invention to further develop this principle, in particular to simplify the assembly effort for the radial stop and at the same time to ensure good pulse dissipation.

The present invention achieves this object by an integral bearing/stop element which also includes two anti-rotation features.

A ball screw 10 comprises a threaded spindle 12 and a spindle nut 14 as known in the art. The threaded spindle 12 is at least partially enclosed coaxially by the spindle nut 14. Both form a space 16 between them, created by complementary facing thread grooves, in which a multiplicity of balls circulate. The spindle nut has (at least) one stop on one axial end face 18. Furthermore, the ball screw drive includes a radial stop element 22. The latter is connected to the threaded spindle 12 in a force-fitting manner and designed to interact with the complementarily designed axial end face 18 of the screw nut 14. The radial stop element ensures that the travel of the threaded spindle/spindle nut system is not limited by the axially aligned end face, but by a stop face arranged on the circumference of the spindle nut, which interacts with a corresponding counter stop face of the radial stop element. Furthermore, a bearing element is provided to receive a longitudinal end of the spindle nut 12. According to the invention, the radial stop element 22 and the bearing element combined are designed as an integral bearing/stop element 24 and has two anti-rotation features 26, 28. This reduces both system complexity and assembly effort.

The first anti-rotation feature 26 is designed such that an angular relationship between the threaded spindle 12 and the bearing/stop element 24 can be adjusted and subsequently fixed in a force-fitting manner. In other words, during assembly, the relative position of the thread end of the spindle with respect to the stop can be adjusted and then permanently fixed.

The second anti-rotation feature 28, in turn, is designed such that the bearing/stop element 24 can be connected to another receptacle in a form-fitting and/or force-fitting manner. This further receptacle can be, for example, a housing or machine part in which the ball screw drive is mounted. The easiest way to do this is to have a part of the bearing/stop element 24 geometrically shaped or technically designed such that it can be mounted to the receptacle in a form-fitting or force-fitting manner. This design could be external toothing, stop faces, through holes, threads, etc.

As a preferred form of implementation, the ball screw 10 can be designed such that the first anti-rotation feature 26 is a system or a combination of a polygon 30 (triangular, square, . . . ) formed on the threaded spindle 12 or a gear wheel radially arranged or formed on the outside of the threaded spindle, which interacts with an internally toothed opening or bore 32 of the bearing/stop element 24. Thus, the anti-rotation feature is provided in that the relative position of the spindle in relation to the bearing/stop element is achieved by plugging the two components together, whereby the polygon and the internal toothing mesh and ensure the anti-rotation protection. The pitch of the internally toothed bore is preferably an integer multiple of the pitch of the polygon 30 or the gear wheel arranged radially on the outside. This ensures that the polygon 30 can be positioned in a force-fitting manner in a multiplicity of positions (angular positions).

The design of the stop 20 on the axial end face 18 of the spindle nut 14 (as stop face to the counterpart on the bearing/stop element 24) is advantageously designed as a projection, cantilever or clearance. Accordingly, at least one radial stop 34 is provided on the bearing/stop element 24 and is designed as a projection, cantilever or clearance. As a result, the function as radial stop element as described above is achieved in conjunction with the correspondingly designed spindle nut.

BRIEF DESCRIPTION OF THE DRAWINGS

FIG. 1 schematically shows a BSD with axial stop.

FIG. 2 shows a BSD with an inventive bearing/stop element 24 with two anti-rotation features.

FIG. 3A shows a BSD in the assembled state with an inventive bearing/stop element 24 in cross section.

FIG. 3B shows a BSD in the assembled state with an inventive bearing/stop element 24 in side view.

DETAILED DESCRIPTION

FIG. 1 shows a BSD 10 with the most elementary components, a threaded spindle 12 and spindle nut 14, which, due to their opposing internal and external threads, form a space 16 between them, which acts as a ball guide. The normally provided ball deflection, which allows a closed circulation of the balls, is omitted. At one end of the threaded spindle 12, a flat stop plate 22 is shown. The latter would rest against the stop face 18 on the end face side as soon as the spindle nut 14 in the drawing would move to the right in the drawing. Such a simple flange stop has the disadvantages described above.

FIG. 2 shows a BSD 10 with the well-known basic elements threaded spindle 12 and spindle nut 14 together with an inventive bearing/stop element 24 with two anti-rotation features. The first anti-rotation feature 26 is the combination of the polygon 30 (shown as a hexagon) and an internally toothed bore 32. The drawing illustrates that this internal toothing has a smaller pitch than the external hexagon 30. As a result, the relative angular relationship between the bearing/stop element 24 and the threaded spindle 12 can be adjusted when plugging them together. Fixing can then be carried out using a split pin, a circlip or by caulking, casting, welding or gluing.

FIG. 2 shows that the stop 20 on the end face 18 of the spindle nut 14 is designed as a projection which can interact with a complementary stop 34 of the bearing/stop element 24. The dimensioning of the stop is determined, among other things, by the thread pitch of the BSD, which ensures the safest possible stop face.

The second anti-rotation feature 28 is shown here as a square outer contour with rounded corners, which can be mounted in a receptacle (not shown) of a housing or bearing.

FIG. 3A shows a BSD 10 in the assembled state with an inventive bearing/stop element 24 in cross-section, FIG. 3b shows a side view. The meaning of the reference symbol is as described above. The situation shown shows the spindle nut 14 in the end stop position at the bearing/stop element 24. FIG. 3B shows how the stop 20 interacts with its counterpart 34. The cross-section clearly shows that there is no jamming at the front face of bearing/stop element 24 and spindle nut 14. FIG. 3B clearly shows that the bearing/abutment element 24 with its outer contour is exposed and can thus be used as an anti-rotation feature. The combination of FIGS. 3A and 3B also illustrates how the bearing, anti-rotation feature and stop can be combined in a compact manner.

The features of the invention disclosed in the above description, in the drawings and in the claims may be essential for the implementation of the invention, either individually or in any combination which is technically useful or advantageous.

The invention claimed is:

1. A ball screw drive (10), comprising:
 a threaded spindle (12),
 a spindle nut (14) which at least partially coaxially encloses the threaded spindle (12) and has a stop on an axial end face (18),
 a plurality of balls that are adapted to circulate in the space (16) between the threaded spindle (12) and the spindle nut (14);
 an integral bearing/stop element (24) connected to the threaded spindle (12) in a force-fitting manner, adapted to interact with the axial end face (18) of the spindle nut (14);
 the integral bearing/stop element receives a first longitudinal end of the threaded spindle (12);
 first and second anti-rotation features (26, 28) are located on the integral bearing/stop element (24); and
 the second anti-rotation feature (28) is formed such that the bearing/stop element (24) is adapted to be connected to a further receptacle in a force-fitting manner.

2. The ball screw drive (10) according to claim 1, wherein the first anti-rotation feature (26) is formed such that an angular relationship between the threaded spindle (12) and the bearing/stop element (24) is adapted to be adjusted and subsequently fixed in a force-fitting manner.

3. The ball screw drive (10) according to claim 1, wherein the first anti-rotation feature (26) is comprised of a system including a polygon (30) integrally formed on the threaded spindle (12) or a gear wheel arranged or integrally formed radially on an outside of the threaded spindle, said polygon or gear wheel interacts with an internally toothed bore (32) of the bearing/stop element (24).

4. The ball screw drive (10) according to claim 3, wherein a pitch of the internally toothed bore is an integer multiple of a pitch of the polygon (30) or of the gear wheel arranged radially on the outside of the threaded spindle.

5. The ball screw drive (10) according to claim 1, wherein the stop (20) on the axial end face (18) of the spindle nut (14) comprises a projection, a cantilever or a clearance.

6. The ball screw drive (10) according to claim 1, further comprising at least one radial stop (34) on the bearing/stop element (24) and comprises a projection, a cantilever, or a clearance.

\* \* \* \* \*